(12) United States Patent
Georges

(10) Patent No.: US 7,804,865 B2
(45) Date of Patent: Sep. 28, 2010

(54) SINGLE-FREQUENCY MONOLITHIC LINEAR LASER DEVICE AND SYSTEM COMPRISING SAME

(75) Inventor: Thierry Georges, Perros-Guirec (FR)

(73) Assignee: Oxxius SA, Lannion (FR)

( * ) Notice: Subject to any disclaimer, the term of this patent is extended or adjusted under 35 U.S.C. 154(b) by 170 days.

(21) Appl. No.: 11/918,474

(22) PCT Filed: Apr. 7, 2006

(86) PCT No.: PCT/FR2006/000770

§ 371 (c)(1),
(2), (4) Date: Oct. 15, 2007

(87) PCT Pub. No.: WO2006/108950

PCT Pub. Date: Oct. 19, 2006

(65) Prior Publication Data

US 2009/0041068 A1    Feb. 12, 2009

(30) Foreign Application Priority Data

Apr. 15, 2005 (FR) .................................. 05 03798

(51) Int. Cl.
*H01S 3/10* (2006.01)

(52) U.S. Cl. .......................................... 372/22; 372/21

(58) Field of Classification Search ............ 372/21, 372/22

See application file for complete search history.

(56) References Cited

U.S. PATENT DOCUMENTS

| | | | |
|---|---|---|---|
| 4,809,291 A | | 2/1989 | Byer et al. |
| 5,256,164 A | | 10/1993 | Mooradian |
| 5,588,014 A | * | 12/1996 | Okazaki et al. ............... 372/22 |
| 5,651,023 A | * | 7/1997 | MacKinnon ................. 372/107 |
| 5,809,048 A | * | 9/1998 | Shichijyo et al. .............. 372/32 |
| 5,838,713 A | | 11/1998 | Shimoji |
| 6,154,472 A | * | 11/2000 | MacKinnon et al. .......... 372/22 |
| 6,373,865 B1 | * | 4/2002 | Nettleton et al. .............. 372/10 |

(Continued)

FOREIGN PATENT DOCUMENTS

FR   2 860 928   4/2005

OTHER PUBLICATIONS

T.Y. Fan, "Single-Axial Mode, Intracavity Doubled Nd:YAG Laser", IEEE Journal of Quantum Electronics, vol. 27, No. 9, Sep. 1991, pp. 2091-2093.

(Continued)

*Primary Examiner*—Tod T Van Roy
(74) *Attorney, Agent, or Firm*—Young & Thompson

(57) ABSTRACT

A laser device includes: an amplifying medium (1, 7) adapted to generate a fundamental wavelength laser beam (13); a birefringent non-linear medium (3, 20, 20) for doubling the fundamental wavelength laser beam to generate a harmonic wavelength laser beam (14); a polarizing medium (1b, 5, 6, 2, 8, 9, 16, 20) for selecting a fundamental wavelength laser beam polarization, the polarizing medium being such that the fundamental wave at its output remains parallel to the fundamental wave at its input. The invention is characterized in that the polarizing medium (1b, 5, 6, 2, 8, 9, 16, 20) has an output side (2b) perpendicular to the fundamental wave exiting the polarizing medium. The amplifying medium, the birefringent non-linear medium are mutually integral so as to constitute a monolithic resonant cavity.

16 Claims, 3 Drawing Sheets

U.S. PATENT DOCUMENTS

2005/0063441 A1* 3/2005 Brown .......................... 372/50
2006/0045148 A1* 3/2006 Zhang et al. ................... 372/22
2006/0209912 A1* 9/2006 Luo et al. ...................... 372/21

OTHER PUBLICATIONS

Hollemann et al., "Frequency-stabilized diode-pumped ND:YAG laser at 946 nm with harmonics at 473 and 237 nm", Optics Letters, vol. 19, No. 3, Feb. 1, 1994, pp. 192-194.

Suzuki et al., "Low-noise diode-pumped intracavity-doubled laser with off-axially cut Nd:YVO$_4$", Optics Letters, vol. 19, No. 20, Oct. 15, 1994, pp. 1624-1626.

Dixon et al., "Efficient blue emission from an intracavity-doubled 946-nm Nd:YAG laser", Optics Letters, vol. 13, No. 2, Feb. 1988, pp. 137-138.

\* cited by examiner

SINGLE-FREQUENCY MONOLITHIC LINEAR LASER DEVICE AND SYSTEM COMPRISING SAME

FIELD OF THE INVENTION

The present invention relates to a laser diode-pumped monolithic solid-state laser device, and more particularly relates to a monomode intracavity-doubled solid-state laser. It also relates to a method used in such a device.

The present invention can be applied particularly beneficially, but not exclusively, in the field of the generation of blue or green laser luminescence.

The laser emission of a beam of good spatial and spectral quality in the visible spectrum at 473 nm for example, using a multimode diode, is of great benefit for industrial and medical applications in particular. This wavelength, termed harmonic, can be obtained by the doubling of frequency of a laser emission at a wavelength, termed fundamental, at 946 nm from yttrium aluminium garnet doped with neodymium (Nd: YAG).

BACKGROUND OF THE INVENTION

Generally, an intracavity-doubled laser comprises a laser diode for pumping a solid-state laser, such as Nd: YAG for example, forming an amplifier at 946 nm. In order to produce the doubling, a non-linear crystal is linked to the amplifier converting the near infrared fundamental signal into a visible signal by frequency doubling, (also known as "second harmonic generation SHG"). An harmonic wavelength equal to the fundamental wavelength divided by two is thus obtained. The amplifier and the non-linear crystal are contained in a cavity the two extreme opposite surfaces of which in the path of the laser beam are reflective for certain wavelengths.

However, if a continuous emission is sought, the power of the fundamental emission is less than the power of the laser diode and the frequency doubling is therefore very inefficient.

The U.S. Pat. No. 4,809,291, entitled "Diode pumped laser and doubling to obtain blue light" is known, in which R. L. Byer and T. Y. Fan propose an intracavity doubling in order to increase the power of a fundamental wavelength at 946 nm and thus increase the doubling efficiency.

In an article entitled "Efficient blue emission from an intracavity-doubled 946 nm Nd: YAG laser" published in 1988 in the journal Optics Letters (vol. 13, pp. 137-139); Dixon et al. present an emission of 5 mW of blue light (473 nm) by an intracavity-doubled Nd:YAG-based microlaser. The Nd concentration is 1.1 at. %. The doubling efficiency is only 2%.

The main problem with these intracavity-doubled lasers is the presence of axial modes and of spurious polarization which reduce the efficiency of the laser and which are the source of high power fluctuations. As an example, Matthews et al., in an article entitled "Diode pumping in a blue (473 nm) Nd:YAG/KNb03 microchip laser" (CLEO'96, vol. 9, p. 174) produce 26.5 mW of blue light with fluctuations of intensity greater than 10%.

More precisely, the intracavity frequency doubling causes selective losses which increase with the pumping power for the main laser emission. When the doubling efficiency increases, the average population inversion of the cavity must increase in order to compensate for the excess loss. However, this allows adjacent modes and the orthogonal polarization emission to start to lase. For the adjacent modes, this effect is in addition to that of "spatial hole burning" which already allows the adjacent modes to lase.

The different modes lasing in the cavity are coupled in the amplifying medium (gain competition) and in the frequency doubling medium (frequency addition). These couplings are non-linear and participate in a complex non-linear dynamic. The latter results in a high or even chaotic fluctuation of power.

If the frequency doubling is of "Type I", the orthogonal polarization modes are not subject to efficient frequency doubling (absence of phase adaptation between the fundamental and the harmonic). These modes stabilize the population inversion by increasing with the pumping power. They slow the conversion efficiency which requires an increase of the population inversion in order to increase. Only "spatial hole burning" effects allow a slight increase in the conversion efficiency.

Several methods have been presented for making the laser monomode or for uncoupling the modes in the non-linear crystal. They can be separated into three categories:

a) The first is the introduction of an etalon into the cavity. This method, disclosed in particular in the U.S. Pat. No. 5,838,713 of Y. Shimoji, poses several problems. The etalon causes losses in the cavity unless it is formed by the faces of the YAG and of the doubling crystal. In the latter case, it requires very great precision in positioning (sub-micrometric) which is difficult to obtain industrially and to stabilize. A way of solving this problem is to bring the amplifying medium into optical contact with the doubling crystal incorporating an angle on one portion of the contact face. This angle produces a small air gap between the two materials. This method weakens the contact and therefore the integrity of a monolithic laser and does not allow the protection of the interface by a bonding agent.

b) The second category involves the polarization of the fundamental. The amplifying medium can be inserted between two quarter wave plates in order to avoid the "spatial hole burning" effect, see in particular G. Hollemann et al., in "Frequency-stabilized diode-pumped Nd: YAG laser at 946 nm with harmonics at 473 nm and 237 nm", Opt. Lett. 19, p. 192, February 1994. One drawback of this method is the introduction of losses into the cavity.

By Type I doubling, is meant an embodiment in which the fundamental laser beam propagates along one of the optical axes of the crystal (in general the slow axis) and the harmonic laser beam propagates along the other optical axis of the crystal, orthogonal to the first. Type I doubling occurs when it is possible to cut the crystal so that the refractive index of an optical axis at the fundamental wavelength is equal to the refractive index of the other optical axis at the harmonic wavelength. This is the case for $KNbO_3$.

By type II doubling, is meant an embodiment in which the fundamental laser beam is present on the two axes and the conversion coefficient is optimized when the polarization of the fundamental laser forms an angle of 45° with respect to the optical axes.

c) The third method consists in reducing the length of the cavity. It was proposed by A. Mooradian in the U.S. Pat. No. 5,256,164 October 1993.

For a linewidth of 1 nm for emission at 946 nm (compared with 0.6 nm for the line at 1.064 µm), Mooradian's formula requires a cavity length of less than 300 µm, including the YAG and the $KNbO_3$. The Nd concentration in the microchips published or patented to date does not exceed 1.1 at. %. This corresponds to an attenuation of 0.85 $mm^{-1}$ at 808.4 nm, i.e. 8.1% of absorbed pump power per 100 µm of thickness and 15.60% of absorbed pump power per 200 µm. However, the 100 or 200 nm of $KNbO_3$ do not provide adequate conversion efficiency. Thus, a microchip laser according to Mooradian's inequality does not appear to be able to emit more than a few mW of blue light with laser diode pump power of 1 W.

The document "Low-noise diode-pumped intracavity-doubled laser with off-axially cut Nd:YVO4", Opt. Lett. 19, p. 1624 (K. Suzuki et al.) describing the use of a walk-off in combination with a planoconcave lens. A device of this kind does not provide high reliability.

Moreover, an efficient method proposed by T. Y. FAN., "Single-Axial Mode, Intracavity Doubled Nd: YAG Laser", IEEE Journal of Quantum Electronics, vol. 27, 9 Sep. 1991, is known for making an intracavity-doubled single-frequency laser. In this method, the amplifying medium (Nd:YAG) is cut at the Brewster angle with respect to the air. The non-linear, birefringent crystal is struck at 45° by the fundamental (type II doubling). The two Brewster angles causes significant losses in the orthogonal polarization and prevents it from lasing. It also causes losses at every wavelength at which the polarization has been rotated by the birefringent crystal. This loss modulation as a function of wavelength can make the laser monomode. On the other hand, this method does not apply to a Type I frequency doubling as, on principle, the signal at the fundamental frequency is on one of the optical axes of the non-linear crystal. However, because of the double refraction, it is not possible to join the amplifying crystal cut at the Brewster angle to the non-linear crystal. In fact, the double refraction introduces phase effects which mean that the beams reflected by the external face of the cavity do not recombine when they return to the amplifier. Finally, the main difficulty of the design proposed by FAN is maintaining the total length of the cavity with a precision of better than a few hundreds of nanometers in order to avoid any mode jump and its subsequent power instabilities. In fact, an increase (or reduction) in the cavity length of $\lambda/4$ (i.e. approximately 250 nm) makes it possible to change from a monomode to a bimode function. A additional increase in length of $\lambda/4$ makes it possible to return to a monomode function on the adjacent mode.

SUMMARY OF THE INVENTION

The present invention aims to solve most of the above drawbacks by proposing an intracavity-doubled solid-state laser which is of compact size, provides great operating stability, and allows Type I and II frequency doublings. Another aim of the invention is to propose a tunable solid-state laser capable of operating in monomode. The invention also relates to a solid-state laser which is powerful whatever the power level of the pumping laser diode. A further aim of the invention is a solid-state laser, having a high reliability.

At least one of the above aims is achieved with a laser device comprising:

an amplifying medium capable of generating a laser beam of fundamental wavelength;
a birefringent non-linear medium with parallel faces for frequency doubling of the laser beam of fundamental wavelength so as to generate a laser beam of harmonic wavelength;
a polarizing medium for selecting a polarization of the laser beam of fundamental wavelength, this polarizing medium being such that the fundamental wavelength at its output remains parallel to the fundamental wavelength at its input.

According to the invention, the polarizing medium comprises an output face perpendicular to the fundamental wavelength exiting from this polarizing medium. Moreover, the amplifying medium, the birefringent non-linear medium and the polarizing medium are firmly attached to each other so as to constitute a monolithic resonant cavity. This polarizing medium is chosen so that it does not cause the fundamental wavelength beam to deviate in absolute terms, i.e. that the fundamental wavelength at the output of the polarizing medium is parallel to the fundamental wavelength at the input of this medium. Thus, by joining together the amplifying medium the polarizing medium and the non-linear medium, it is possible to constitute a monolithic resonant cavity.

The cavity preferably has a linear shape.

With the device according to the present invention, a monolithic structure is obtained due to the fact that the different media can be firmly attached or joined together. The polarizing element, which does not cause the beam to deviate in absolute terms (double deflections can be produced in Brewster angles, as will be seen below), allows a linear cavity to be obtained (cavity in which the laser beam is parallel to one axis almost everywhere in the cavity) where the input and output faces are parallel. The present invention therefore proposes a solid-state laser device which is highly reliable, as it is easy to manufacture and is very stable over time. The different elements making up the device can be designed independently then assembled optically. The cavity is mechanically solid.

In particular, the amplifying medium, the polarizing medium and the birefringent non-linear medium are joined in a linear manner; each medium comprising an input face and an output face which are mutually parallel and parallel with the other faces of the other media; these faces being orthogonal to the output direction of the harmonic wavelength laser beam. The cavity is completed on the one hand by the input face of the amplifying medium and on the other hand by the output face of the birefringent non-linear medium.

The selection is made either by attenuation of a polarization of the fundamental wavelength or by deflection of the latter by means of a mirror as will be shown below. The selection of a polarization of the fundamental wavelength consists in fact of preventing the oscillation of the polarization which does not produce blue by frequency doubling. This means that this solid-state laser according to the invention can generate a powerful signal at whatever the power level of a pump used. This also allows the Lyot filter to be produced.

According to an advantageous feature of the invention, the birefringent non-linear medium comprises a type I non-linear crystal. This is not the case in the FAN document for example. A type II non-linear crystal for example, can also be used in the present invention.

According to an advantageous feature of the invention, the birefringent non-linear medium is constituted by a type I non-linear crystal the birefringent axes of which form non-zero angles modulo $\pi/2$ radians with respect to the polarization selected by the polarizing medium. It can be said that the non-linear crystal is arranged off-axis. With an arrangement of this type, the device constitutes a Lyot filter. The invention is thus remarkable for the fact that an off-axis type I non-linear crystal is used, which is generally considered an "abnormal" and ineffective way of doing things. In fact, type I doubling is more effective when the polarization of the fundamental wavelength is parallel to one of the birefringence axes of the non-linear crystal. The embodiment according to the invention allows a single crystal to be used for the functions of non-linearity and birefringence necessary for the Lyot filter. In the FAN document, the cavity is not monolithic, and the doubling is type II. If the FAN principle is applied directly to a type I doubling, the Lyot filter no longer exists, as then the axes of the non-linear crystal are aligned with the selected polarization.

According to a second advantageous feature of the invention, the non-linear medium being arranged off-axis, it is joined to a birefringent crystal so that the axes of birefringence of this birefringent crystal remain parallel to those of said non-linear crystal. The advantage of an embodiment of this type is that the length of the non-linear crystal is not solely imposed by of the requirements of the Lyot filter. In fact, the addition of birefringence makes it possible to compensate for a part of these requirements and thus allows a non-linear crystal length suitable for the frequency doubling.

According to a third advantageous feature of the invention, the birefringent medium is independent of the non-linear crystal. In this case, the doubling efficiency stimulates orientation of the axes, or one of the axes, of the non-linear crystal parallel to the polarization selected by the polarizing medium. Moreover, a birefringent crystal is joined to said non-linear crystal so that the birefringence axes of this birefringent crystal form non-zero angles modulo $\pi/2$ radians with respect to the polarization selected by the polarizing medium so that the device constitutes a Lyot filter.

Said selected polarization is preferably that adapted to the phase matching between the fundamental wavelength and the harmonic wavelength.

A combination of this type of Brewster angle interface and an off-axis birefringent crystal (or several crystals) allows a single mode to be selected. In fact, the Brewster interface causes a selective loss to the orthogonal polarization. Only wavelengths for which the phase shift due to the birefringence is a multiple of $2\pi$ retain the low-loss polarization at the Brewster interface. This constitutes a periodic filter having its minimum loss at wavelengths $\lambda_m = (\Sigma \delta n_1 I_1)/m$ where $\delta n_1$ and $I_1$ are the index difference and the length of the off-axis birefringent elements respectively. The sum is applicable only in the second advantageous feature of the invention. The wavelength $\lambda_m$ depends on the temperature as the crystal lengths and the index differences depend on the temperature. The filter is thus tunable by temperature. The free spectral band of the filter (i.e. the wavelength difference between two transmission peaks) is $FSB = \lambda^2/(\Sigma \delta n_1 I_1)$ where $\lambda^2$ is the laser emission length.

The filter is the more selective when the birefringence axes form an angle $\theta = \pi/4$ radians (modulo $\pi/2$) with respect to the polarization stimulated by the polarizing medium.

By adjusting in particular the length of the off-axis birefringent crystals, it is possible to select only a single mode in the emission band (width at mid-height $\Delta\lambda_m$) provided that FSB and $\Delta\lambda_m$ are of the same order of magnitude to a factor of approximately 2 or 3. Preferably, the parameters of the birefringent crystals are chosen so that the FSB of the filter is comprised between 0.5 and 3 times the emission length at mid-width ($\Delta\lambda_m$) of the amplifying medium.

In other words, the index of the isotropic medium and the angle $\theta$ associated with the length of the birefringent crystal can be adjusted in order to allow only a single mode in the cavity.

According to the invention, the cut angles of the non-linear crystal are such that adjustment of the temperature of the crystal (within a reasonable range) allows phase matching between the fundamental wavelength and the doubled frequency wavelength. The non-linear crystal can for example be constituted by potassium niobate (KNbO3) or from lithium borate LBO. The birefringent crystal can be constituted from vanadate YVO4.

According to a first advantageous variant of the invention, the polarizing medium comprises a primary element followed by an intermediate medium and a secondary element, the refractive index of which is substantially identical to the refractive index of the primary element; the output face of the primary element and the input face of the secondary element being parallel and cut according to the Brewster angle for the length of fundamental wavelength.

The intermediate medium can be constituted by air. In this case, the primary element is firmly attached to the secondary element by means of a dynamic bonding agent or by means of latching contact with a perforated washer. The intermediate medium can also be constituted by silica.

In the present first variant, when the polarizing medium is arranged between the amplifying medium and the birefringent non-linear medium, the primary element can be constituted by the amplifying medium. More precisely, the amplifying medium has at the input a face perpendicular to the direction of propagation of the fundamental wave, and at the output a face cut according to the Brewster angle with respect to this fundamental wave. Preferably, the amplifying medium is constituted by yttrium aluminium garnet YAG doped with neodymium Nd (Nd: YAG); the secondary element being constituted by undoped yttrium aluminium garnet (YAG). The Nd:YAG crystal can have a cylindrical shape with an input face forming a flat mirror.

The polarizing medium can also be separate from the amplifying medium. In this case, the primary element and the secondary element can be constituted by undoped yttrium aluminium garnet (YAG). Otherwise, the primary element and the secondary element can be constituted by silica, the intermediate medium then being of undoped yttrium aluminium garnet (YAG).

With a device of this type, provided that the primary and secondary elements have the same angle (this is easily done when they are produced together), it is not necessary to achieve an excessively high precision (less than a few minutes of angle) when the Brewster angles are produced, this allows a more rapid and less expensive industrialization.

When Brewster angles are not used, use can be made of the walk off effect (or double refraction) associated with a spatial loss modulation, according to a second variant of the invention. Thus, the polarizing medium is constituted by a birefringent crystal cut off-axis such as to present a strong "walk-off" between the two polarizations of the fundamental wavelength laser beam; the spatial loss modulation being obtainable by closure of the cavity by a planoconvex lens.

The document "Low-noise diode-pumped intracavity-doubled laser with off-axially cut Nd:YVO4", Opt. Lett. 19, p. 1624 (K. Suzuki et al.) describes the use of a planoconcave lens which does not allow a monolithic assembly. On the other hand, since the amplifying medium is polarized. It is not clearly apparent which device (polarizer or polarized emission) predominates in the polarization selection.

According to another aspect of the invention, a laser system is envisaged comprising a pumping means for a solid-state laser device as described above. Advantageously, the laser beam emitted by said pumping means propagates in a direction orthogonal to the input face of the amplifying medium of the solid-state laser device.

BRIEF DESCRIPTION OF THE DRAWINGS

Other advantages and characteristics of the invention will become apparent on examination of the detailed description of an embodiment which is in no way limitative, and the attached diagrams, in which.

DETAILED DESCRIPTION OF EMBODIMENTS

An intracavity frequency-doubled monolithic laser device comprising a Nd: YAG laser emitting at 946 nm, with intracavity doubling at 473 nm with a $KNbO_3$ crystal will now be described, although the invention is not limited to this embodiment.

Figure 1:
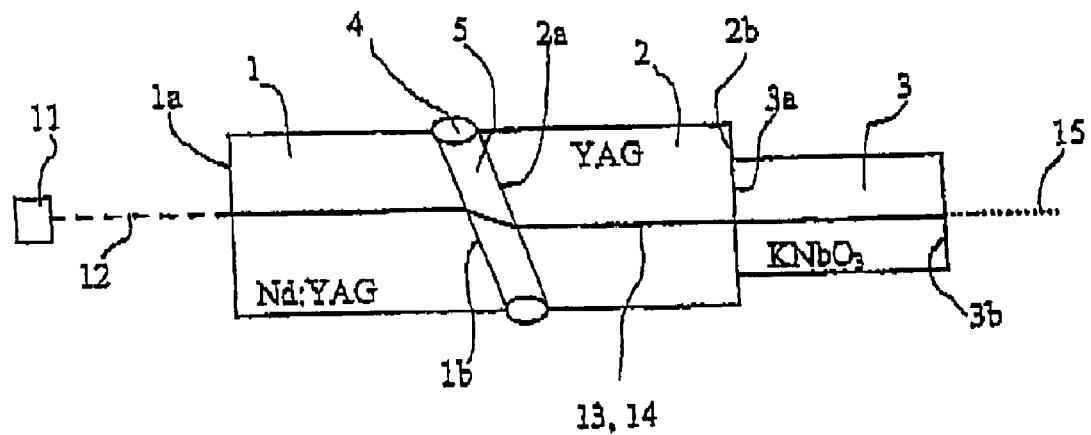
FIG. 1 is a diagrammatic view of a solid-state laser according to the invention comprising an amplifying medium cut according to the Brewster angle, the polarizing medium comprising an air space.
Figure 2:
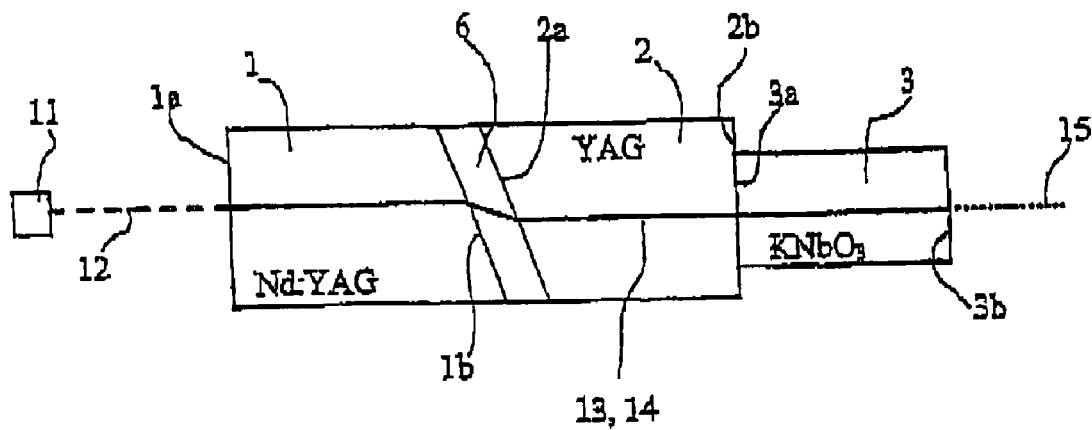
FIG. 2 is a diagrammatic view of a solid-state laser according to the invention comprising an amplifying medium cut according to the Brewster angle, the polarizing medium comprising a slice of silica.

With reference to FIGS. 1 and 2, a pumping laser diode 11 is shown emitting a laser beam 12 at 808 nm towards a cavity composed of an assembly of three crystals 1, 2, and 3. The crystal amplifier 1 is Nd:YAG. Its refractive index is $n_1$=1.82 to 946 nm. The input face 1a of this crystal 1 is treated such as to constitute a flat mirror. Its output face 1b is cut at the Brewster angle calculated from the index $n_1$ and the index $n_5$ or $n_6$ of medium 5 or 6. In FIG. 1, medium 5 is constituted by air, while in FIG. 2 the medium 6 is a parallel slice of silica. This parallel slice 5 or 6 is wedged between the output face 1b of the crystal amplifier 1 and the input face 2a of a crystal constituted by undoped yttrium aluminium garnet (YAG) (white YAG) 2 of index $n_1$. This face 2b is also cut according to the Brewster angle and arranged parallel to the face 1b. Preferably the two faces 1b and 2a are polished simultaneously and assembly can then be can then be done blindly. This method of implementation is very tolerant as regards the precision of the cut according to the Brewster angle, which facilitates the production of such solid-state lasers. When the parallel space is air, a spacer with parallel faces can be used or a dynamic bonding agent 4 or 10 controlled by laser shown in FIGS. 1 and 3. This bonding is applied to the periphery of the parallel space 5. In contrast on FIG. 2, a silica slice 6 is used, which is attached to the two parallel faces 1b and 2a.

A birefringent frequency doubler crystal 3 constituted by potassium niobate KNbO3 is joined to the output face 2b.

The three crystals 1, 2 and 3 form a linear resonant cavity.

The input face 1a of the Nd: YAG 1 and the output face 3b of the $KNbO_3$ 4 are parallel and are treated in a conventional manner in order to constitute a resonant cavity. The beam 15 exiting from the face 3b can be at 946 nm or at 473 nm.

The diagram of FIG. 1 is based on a vertical polarization of the signal at 946 nm in the Nd: YAG. The vertical axis is situated in the plane of the figure, the horizontal axis being perpendicular to this plane. A person skilled in the art will be able to easily adapt this diagram for a linear horizontal or any other type of polarization.

Polarization of the fundamental signal is vertical in the case shown. If axis c of the potassium niobate crystal were horizontal, the optical axes would be horizontal and vertical. The fundamental signal would then propagate along a birefringent axis and its polarization could no longer be rotated. If axis c and therefore the birefringent axes are rotated as in the present case, the fundamental wavelength is no longer in the birefringent axes and its polarization is therefore rotated during propagation in the crystal. The selection of polarization rotation mode can then come into effect.

In the birefringent crystal $KNbO_3$, the input face 3a contains the axis c and cuts the plane ab according to an angle φ=32° with respect to the axis b such as to obtain a phase matching between the wavelengths 946 nm and 473 nm at 308 K. A person skilled in the art will be able to modify this angle for a phase adaptation at other temperatures. At 946 nm, the refractive index on the axis c is $n_{3f}$=2.127 and the refractive-index on the orthogonal axis is $n_{3s}$=2.238. The birefringence is therefore characterized by $\Delta n_3$=0.111. Generally, the device according to the invention can constitute a Lyot filter such that the axes of the birefringent crystal are not parallel to the Brewster interface.

As regards the optical path followed by the different laser beams, the laser beam 12 emitted by the pump 11 reaches the Nd: YAG crystal 1 on the input face 1a according to a normal direction to this face 1a. The Nd: YAG 1 thus excited, generates a laser beam 13 which oscillates between the mirror faces 1a and 3b. As it passes through the parallel slice 5, 6, the laser beam 13 experiences a deflection at each face 1b, 2a so that the laser beam 13 leaving the parallel slice 5, 6 is parallel to the laser beam 13 entering the parallel slice 5, 6. Passing between the white YAG 2 and the KNbO3 linear birefringent crystal does not deflect the laser beam 13. The frequency doubling occurs within this KNbO3 crystal 3, this being expressed by the generation of the harmonic wavelength laser beam 14 which exits the laser via the face 3b.

The cavity therefore has input and output faces which are mutually parallel but orthogonal to the laser beam originating from the pump and to the laser beam exiting from the solid-state laser.

In FIGS. 1 and 2, the amplifying medium is constituted by the Nd: YAG 1. The polarizing medium comprises a primary element which is also this Nd:YAG crystal 1, or more precisely the output face 1b of this crystal 1; an intermediate medium which is the parallel slice 5, 6; and a secondary element which is the white YAG crystal 2.

Figure 3:
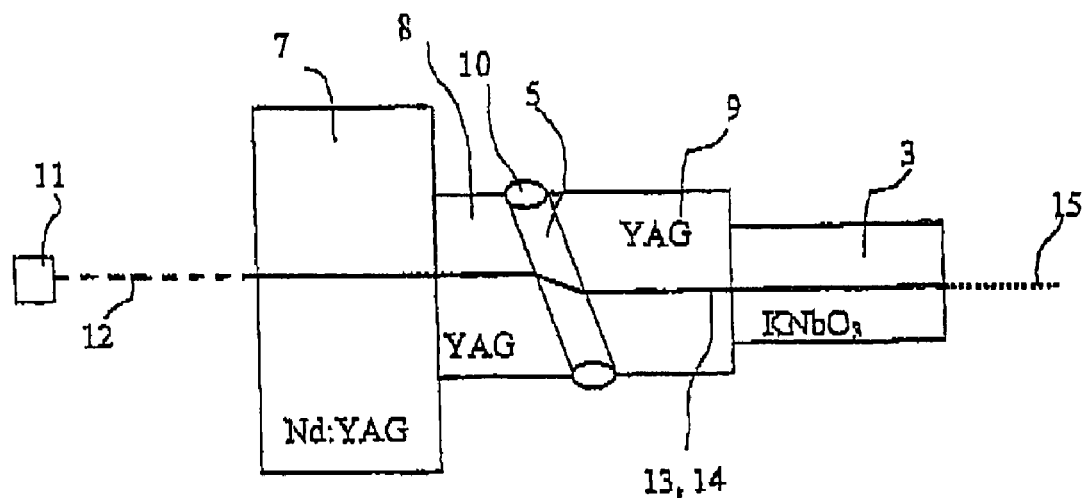
FIG. 3 is a diagrammatic view of a solid-state laser according to the invention, in which the polarizing medium comprises an air space between two walls cut according to the Brewster angle.
Figure 4:
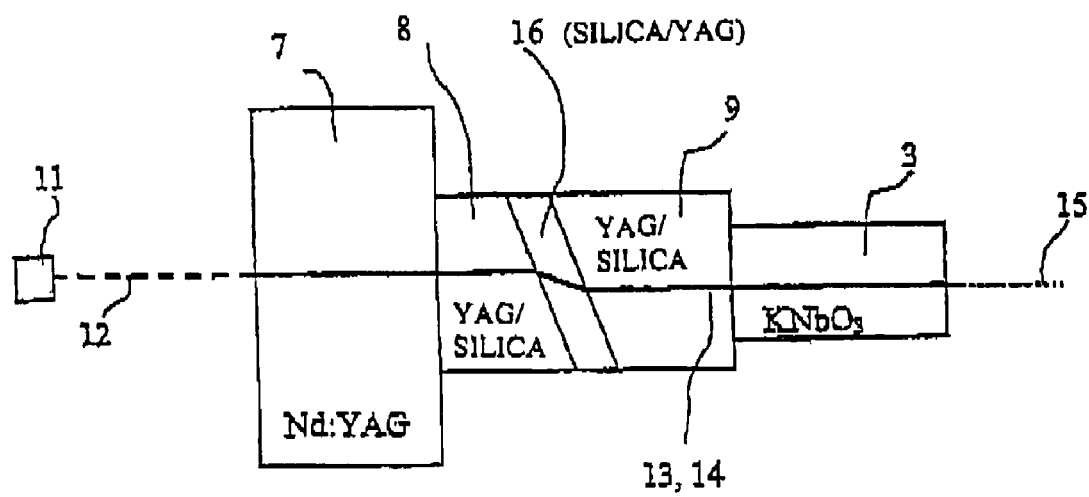
FIG. 4 is a diagrammatic view of a solid-state laser according to the invention in which the polarizing medium comprises a slice of silica between two walls cut according to the Brewster angle.

In contrast, in FIGS. 3 and 4 the polarizing medium is separate from the amplifying medium which is constituted by an uncut Nd: YAG crystal 7. The polarizing medium comprises a primary element 8 and a secondary element 9 which can be white YAG (undoped) in combination with a parallel slice 5, 16 which can be of air 5 with dynamic bonding 10 or silica 16. The two primary and secondary elements can also be of silica when the parallel slice is white YAG or air. The implementation and functioning remain equivalent to the description with reference to FIGS. 1 and 2.

Particularly complementing the above, when the parallel slice is a joined silica slice, an opening can be made at the place where the laser beams pass, so that these laser beams in fact pass through the air without penetrating into the silica.

Figure 5:
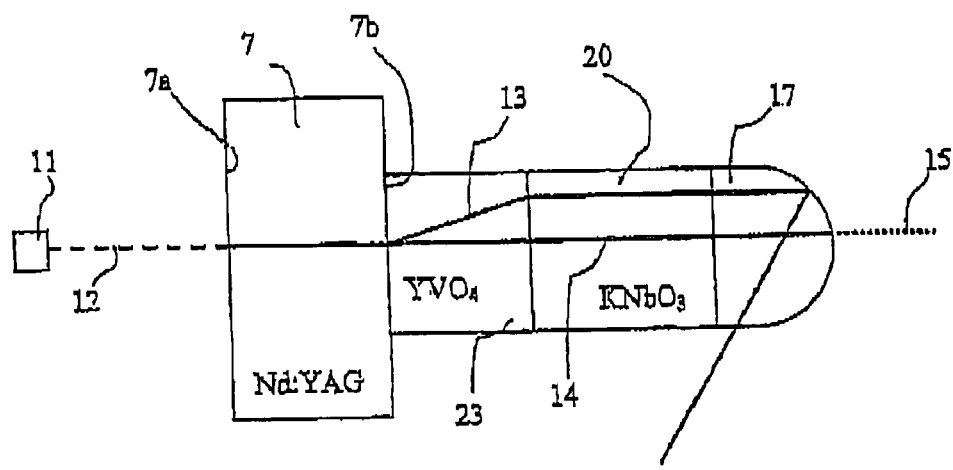
FIG. 5 is a diagrammatic view of a solid-state laser according to the invention in which the polarizing medium comprises a birefringent crystal with walk-off and a planoconvex mirror.

The device in FIG. 5 is particular in the sense that it does not comprise a Brewster angle. The amplifying medium is also a Nd: YAG crystal 7 with parallel walls 7a and 7b. A birefringent $YVO_4$ crystal 23 cut so as to maximize the walk-off between the two polarizations is joined on the face 7b. The off-axis joined KNbO3 20, in combination with a planoconvex lens 17, close the cavity. The lens corrects the angle imperfections of the different crystals. The two polarizations are that of the fundamental wavelength laser beam 13 and that of the harmonic wavelength laser beam 14. The laser beam 13 is ejected from the resonant cavity by reflection on the convex part of the lens 17.

In FIGS. 1 to 5, the KNbO3 crystal is used such as a non-linear and birefringent element, its high sensitivity to temperature allows the emission wavelength 14 to be tuned. The axes of this crystal are oriented at 45° to the polarization axes of the polarizing element. LBO can also be used as non-linear and birefringent crystal.

Figure 6:
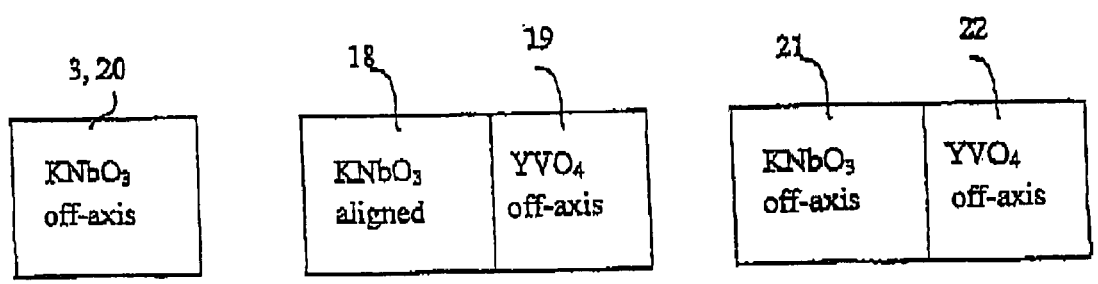
FIG. 6 is a diagrammatic view illustrating three examples of the implementation of birefringence to achieve the desired filtering properties while guaranteeing an effective non-linear effect.

Nevertheless, as shown in FIG. 6, it is possible to separate the non-linearity function by using the KNbO3 or LBO crystal 18 the axes of which are aligned with those of the polarizer by using the vanadate YVO4 crystal 19 the axes of which are rotated. The vanadate (YVO4) crystal closes the laser cavity. This adds an element and an interface, but the advantage is the use of the non-linear crystal 18 in its axes, which achieves a maximum doubling efficiency for a type I doubler in particular. YVO4 is recommended as a birefringent crystal due to its high birefringence. Due to the low dependence on temperature of the refractive indices of the YVO4, the laser is less easy to tune, but on the other hand, single frequency operation has a greater temperature range, i.e. approximately 25 times greater than that obtained with the off-axis KNbO3. The consequence of the low tunability is that the free spectral band FSB of the Lyot filter is preferably of the order of the emission width of the laser transition. In fact, with an FSB which is too small, there is a danger of lasing over several modes. With a FSB which is too large, there is a danger of not finding any filter peak in the emission band.

In FIG. 6, a third example can also be seen in which an non-linear KNbO3 crystal 21 which is arranged off-axis is joined with a birefringent YVO4 crystal 22 also arranged off-axis. This solution allows the FSB to be adjusted while retaining an optimal length of KNbO3 for the frequency doubling.

Of course, the invention is not limited to the examples which have just been described and numerous adjustments can be made to these examples without exceeding the scope of the invention.

The invention claimed is:

1. A monomode laser device comprising:
   an amplifying medium capable of generating a laser beam of fundamental wavelength;
   a birefringent non-linear medium with parallel faces for frequency doubling of the laser beam of fundamental wavelength so as to generate a laser beam of harmonic wavelength; and
   a polarizing medium for selecting a polarization of the laser beam of fundamental wavelength, said polarizing medium being such that the fundamental wavelength at its output remains parallel to the fundamental wavelength at its input,
   wherein the polarizing medium comprises an output face perpendicular to the fundamental wavelength exiting from said polarizing medium,
   wherein the amplifying medium, the birefringent non-linear medium and the polarizing medium are firmly attached so as to constitute a monolithic resonant cavity of said monomode laser,
   wherein the birefringent non-linear medium is constituted by a type I non-linear crystal the birefringent axes of which form non-zero angles modulo $\pi/2$ radians with respect to the polarization selected by the polarizing medium such that the device constitutes a Lyot filter, and wherein a birefringent crystal is joined to said non-linear crystal in such a way that the birefringence axes of this birefringent crystal remain parallel to those of said non-linear crystal.

2. The device according to claim 1, wherein the angle between the axes of birefringence and the selected polarization is approximately equal to $\pi/4$ radians.

3. The device according to claim 1, wherein the birefringent crystal is constituted by vanadate YVO4.

4. The device according to claim 1, wherein the non-linear crystal is constituted by potassium niobate (KNbO3).

5. The device according to claim 1, wherein the non-linear crystal is constituted by lithium borate LBO.

6. The device according to claim 1, wherein the amplifying medium, the polarizing medium and the birefringent non-linear medium are joined in a linear fashion; each medium comprising an input face and an output face which are mutually parallel and parallel with the other faces of the other media; input and output faces being orthogonal to the output direction of the laser beam of harmonic wavelength.

7. The device according to claim 1, wherein the polarizing medium comprises a primary element followed by an intermediate medium and a secondary element the refractive index of which is substantially identical to the refractive index of the primary element; the output face of the primary element and the input face of the secondary element being parallel and cut according to the Brewster angle for the fundamental wavelength.

8. The device according to claim 7, wherein the intermediate medium is constituted by air.

9. The device according to claim 8, wherein the primary element firmly attached to the secondary element by means of a dynamic bonding agent.

10. The device according to claim 7, wherein the intermediate medium is constituted by silica.

11. The device according to claim 7, wherein, the polarizing medium being arranged between the amplifying medium and the birefringent non-linear medium, the primary element is constituted by the amplifying medium.

12. The device according to claim 11, wherein the amplifying medium is constituted by yttrium aluminium garnet YAG doped with neodymium Nd; the secondary element being constituted by undoped yttrium aluminium garnet (YAG).

13. The device according to claim 7, wherein the primary element and the secondary element are constituted by undoped yttrium aluminium garnet (YAG).

14. The device according to claim 7, wherein the primary element and the secondary element are constituted by silica, the intermediate medium being undoped yttrium aluminium garnet (YAG).

15. The device according to claim 1, wherein the polarizing medium is constituted by a birefringent crystal cut off-axis so as to have a "walk-off" effect between the two polarizations of the laser beam of fundamental wavelength; the resonant cavity being closed by a planoconvex lens.

16. A laser system comprising a pumping means for a solid-state laser device according to claim 1, a laser beam emitted by said pumping means being propagated along a direction orthogonal to the input face of the amplifying medium of the solid-state laser device.

* * * * *